Jan. 7, 1969 E. LYGHOUNIS 3,421,089

CIRCUITS FOR REDUCING DISTORTION IN A DEMODULATOR FOR DATA TRANSMISSION

Filed April 5, 1965

INVENTOR

Evangelo Lyghounis

BY Irwin S. Thompson

ATTORNEY

United States Patent Office 3,421,089

Patented Jan. 7, 1969

3,421,089

CIRCUITS FOR REDUCING DISTORTION IN A DEMODULATOR FOR DATA TRANSMISSION

Evangelo Lyghounis, Milan, Italy, assignor to Società Italiana Telecomunicazioni Siemens S.p.A.

Filed Apr. 5, 1965, Ser. No. 445,359

Claims priority, application Italy, Apr. 7, 1964, 7,571/64

U.S. Cl. 325—320 6 Claims

Int. Cl. H04b *1/16;* H04b *1/10;* H03b *1/04*

ABSTRACT OF THE DISCLOSURE

A circuit for reducing fortuitous telegraph distortion in telegraphic signals for data transmission comprises parallel circuits occurring at the receiving side of a telegraphic system. The code pulses modulate in frequency a carrier having a sine wave form in which the incoming modulated signal is collectively fed into two parallel shifting networks, each including a phase-shift network having an output signal fed into a clipper which reduces the signal carrier wave form to substantially square wave form. The output of each is then fed into a differentiating network, and the two outputs of the differentiating network are fed to a common adding network in which the positive and negative pulses of the input signals of the two phase-shift networks are combined in proper relationship to each other with respect to the time interval of the transmission. The output of the adding network is then fed into a rectifier network where all pulses have the same polarity and a frequency double that of the input sine form signal.

The present invention relates to improvements in circuits for reducing distortion in telegraphic signals for data transmission, and pertains more particularly, to a telegraphic system which employs phase-shifting networks in parallel circuit arrangement to remove the distortion telegraph occurring at the receiving side of the telegraphic system.

Many presently known telegraphic systems which make use of the telephonic frequency band for the data transmission by frequency modulation, experience telegraph distortion at the receiving side because the ratio between the frequency of the carrier current and the transmission rate is only slightly greater than unity.

For instance, in the normalization forecast by the papers of the CCITT, in the case of transmission rate 1200 bauds the carrier current frequency has the value of $1700\pm400$ cycles per second, according to the polarity of the modulating signal that is, $1700+400$ c.p.s. for negative signal and $1700-400$ c.p.s. for positive signal, and the aforementioned ratio becomes $1700/1200=1.42$. It is to be understood, that the word 'baud" is a unit of measurement equal to one dot per second or the equivalent per second or the equivalent interval per second as used in measuring the speed of signaling in telegraphic code.

In order to overcome this difficulty, some demodulation methods have been employed in the past based on the evaluation of the time interval between the two following instants in which the carrier current crosses the zero position.

The primary object of this invention is to overcome the distortion problem by providing a telegraphic message system in which the code pulses modulate in frequency a carrier having a sine waveform in which the incoming modulated signal is collectively fed into two parallel shifting networks, each including a phase-shift network having an output signal fed into a clipper, which reduces the signal and carrier waveform to that of a substantially square waveform, the output of which is then fed into a differentiating network. The intelligence output signal of each differentiating network is then fed into a common adding network (e.g., an OR gate) in which the positive and negative pulses of the input signals of the two phase-shift networks are combined in proper relationship to each other with respect to the time interval of the transmission. The output of the adding network is then fed into a rectifier network where all pulses have the same polarity and a frequency double that of the input sine form signal.

In this telegraphic transmission system the values of the carrier current frequency are indicated by $f_1$, corresponding to the positive polarity and $f_2$ to the negative polarity of the modulating signal in which $f_2$ is greater than $f_1$; with $$f_0=\frac{f_1+f_2}{2}$$

the mean value of these two frequencies. As long as the modulating signal polarity is positive, the carrier frequency is $f_1$ and the following crossing through the zero position between positive and negative values and vice versa are distant $T_1/2$, where $$T_1=\frac{1}{f_1}$$

(In fact there is a crossing of the zero position every half period of the above signal.) Analogously, it may be seen that if the modulating signal polarity is negative, the carrier frequency is $f_2$ and the following crossing through the zero of the carrier current are distant $T_2/2$, where $$T_2=\frac{1}{f_2}$$

From the above, it appears that the modulating signal may be reproduced only if one knows that the aforementioned distances are $T_1/2$ or $T_2/2$. Thus the positive (negative) sign may be assigned to the demodulated signal if the intervals between the following crossing of the zero position is greater or smaller than $$\frac{T_1+T_2}{4}$$

In general, there is no connection between frequencies $f_1$ and $f_2$ and the modulation rate; consequently the modulating signal at the transmitting side passes from positive polarity to negative polarity, or on the contrary, in instants that generally do not coincide with the instants in which the carrier current crosses the zero value. On the contrary, at the receiving side the change of polarity can be noticed only at the instants of crossing through the zero value. In consequence, the time elapsing between a polarity change at the transmitting side and the corresponding change at the receiving side is $\tau\pm\Delta\tau$, where $\tau$ is the system propagation delay and $\Delta\tau$ is an error which on the average equals $$\frac{T_1+T_2}{8}$$

In such a type of telegraphic demodulation system, said error of the evaluation of the instants of crossing through the zero value causes the telegraphic distortion of the detected signal of approximately $$\pm18.7\%=v_0\frac{T_1+T_2}{8}\cdot100$$

($v$=transmission rate).

The principal object of the present invention is to provide a system that doubles the number of the instants in which the frequency value is determined and therefore the abovementioned usual telegraphic message distortion becomes one half of that of the conventional telegraphic system. This system still uses the same frequencies $f_1$ and $f_2$ and the same modulation speed of the conventional telegraphic system. Correction of the above distortion in the system of this invention is accomplished through the use of special circuit arrangements, in which the received signal is brought at the same time to two all-pass shifting networks of known type which are so proportioned that the outgoing signals have a phase shift of substantially 180/2=90 degrees in the whole frequency band concerning the transmission, in which short pulses, characterizing the crossing, are obtained from the signal leaving each network and the pulses so obtained from the two ways, are later added in one output, and rectified so that all code pulses have the same polarity.

The accompanying drawing illustrates in a nonlimitative way a mode of practical execution of the invention.

Figures 1, 2, 3A, 3B, 4A, 4B, 5, 6:
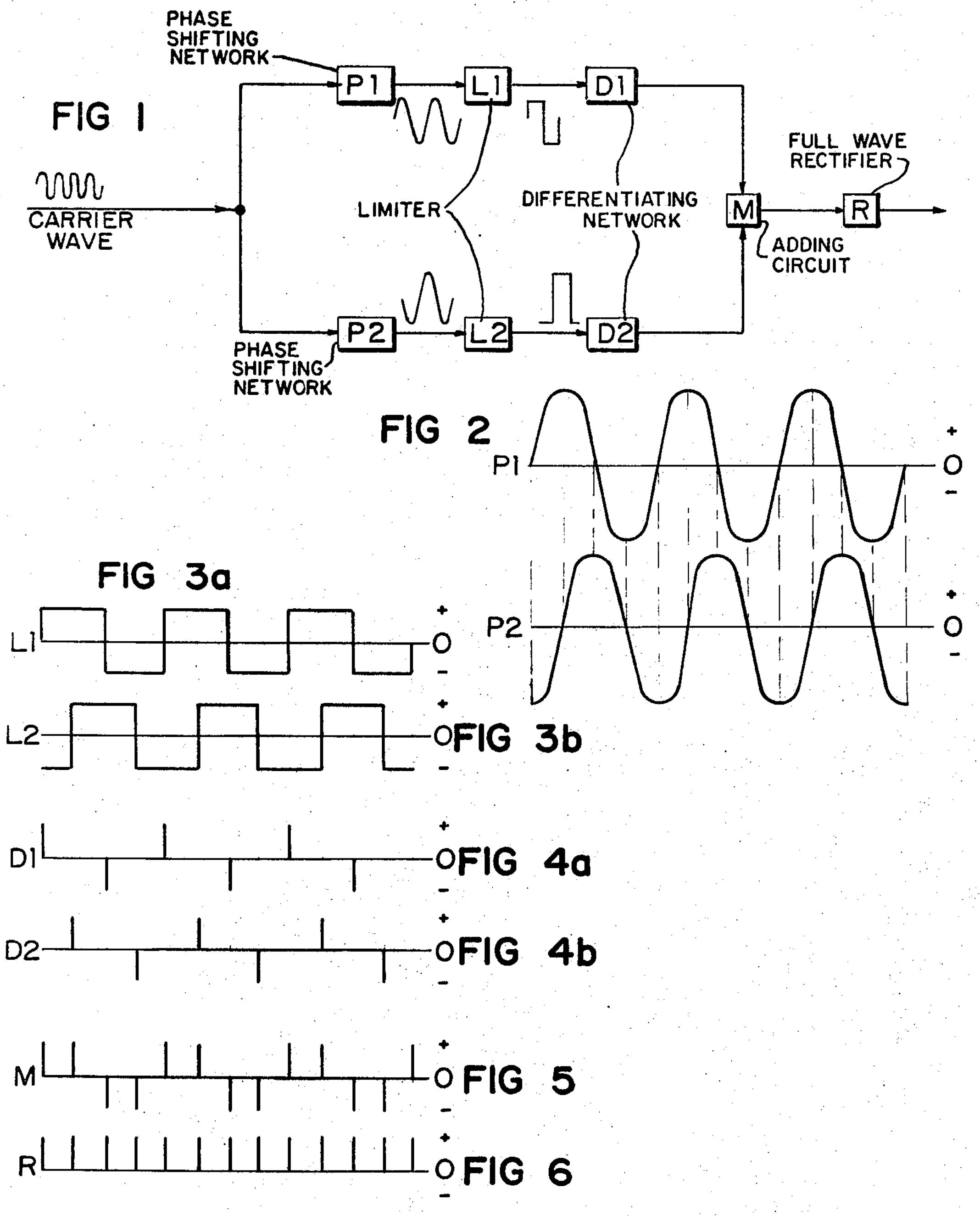
FIGURE 1 shows in block diagram the arrangement of circuits, according to the invention, where the signal is fed into two parallel phase-shifting networks wherein the two signals are clipped and differentiated and then added and rectified.
FIGURE 2 shows the phase relationship between the two signals leaving the two shifting networks of FIGURE 1.

FIGURES 3*a* and 3*b* show, respectively, the waveforms at the outputs of the two clipper means of FIGURE 1;

FIGURES 4*a* and 4*b* show, respectively, the pulses at the output of the two differentiating networks of FIGURE 1;

FIGURE 5 shows the polarity arrangement of the impulses of the resultant output of the adding circuit of FIGURE 1; and FIGURE 6 shows the pulses all arranged with the proper polarity after rectification.

Referring to the drawings, FIGURE 1 shows an embodiment of the invention, in which a received signal in the form of a frequency modulated sine wave is simultaneously fed into two phase-shifting networks $P_1$ and $P_2$, both being of the all-pass frequency type, designed so that the phase difference between the two output signals is comprised between $90-\epsilon$ and $90+\epsilon$ degrees, in which $\epsilon$ represents any desired arbitrary number of degrees of phase shift of the signal, for all the frequencies of the transmission frequency band. The phase relationships between these two signals are shown in FIGURE 2. The number $\epsilon$ is so chosen that the distortion due to the presence of number $\epsilon$ will be contained in desired allowed limits to prevent distortion in the end result of a transmitted message. This concept, as understood by those skilled in the art, will be explained in more detail hereinafter.

As to the transmission band width, the modulation index $n$ being low, $n=400/600=0.67$, in the above-described case of a transmission rate of 1200 bauds, in which it may be considered that the band extends between $1700-600=1100$ cycles per second, and $$1700+600=2300$$

cyles per second, because in this case, the frequency spectrum constituting the modulated wave, is essentially made up of the carrier and of the two adjoining lines at ±600 cycles per second.

Referring to FIGURES 1, 3*a* and 3*b*, it may be seen that the signals, leaving the two shifting networks $P_1$ and $P_2$, are amplified and limited respectively, by the two clipper means $L_1$ and $L_2$, that provide two substantially rectangular waves having different phase relationships. In turn, these rectangular waves are derived by the differentiating networks $D_1$ and $D_2$, leaving only the original message pulses shown in FIGURES 4*a* and 4*b*. The outputs from circuits $D_1$ and $D_2$ are added in the adding network M, providing the pulses shown in FIGURE 5.

At the output end of FIGURE 1, a full wave rectifier circuit R makes the polarity of all these code pulses the same, as can be seen in FIGURE 6. This waveform may be applied to a conventional circuit that selects the demodulated signal polarity, on the ground of the time interval separating the single pulses. It appears that this interval between following pulses depends on the aforementioned number $\epsilon$ also. In fact, the variation of the time intervals between following code pulses due to $\epsilon$ in phase shift degrees is $$\frac{T_0}{4}\cdot\frac{\epsilon}{90}$$

where $$T_0=\frac{1}{f_0}$$

and the resulting telegraphic distortion, in percent, in the case of the transmission rate of 1200 bauds, becomes $$100\cdot\frac{T_0}{4}\cdot\frac{\epsilon}{90}\cdot 1200\simeq 333\cdot T_0\cdot\epsilon$$

For the mode that makes use of the characteristic frequencies forecast by CCITT, as was previously explained, the distortion is $$\frac{333\cdot\epsilon}{1700}\simeq 0.2\epsilon \text{ percent}$$

The number $\epsilon$ is so chosen that the relative telegraphic distortion is comprised within the required distortion limits.

Approaching the problem another way, it is possible that the same waveform drives a bistable circuit, providing in this manner a substantially rectangular wave that, not considering the error of the aforementioned quantity $\epsilon$, corresponds exactly to the wave that would be obtained by clipping a frequency modulated sine current in which the frequencies $f_1$ and $f_2$ become respectively $2f_1$ and $2f_2$. In this case the ratio between $$\frac{2f_1+2f_2}{2}$$

and the modulation rate becomes double, and it could be advantageous to make use of a frequency normal demodulator of linear type.

The limitation to two shifting networks $P_1$ and $P_2$ is not necessarily peculiar to the system; this limitation is set for economic reasons.

If there were available suitable and economical shifting networks, that are supposed to be known, the network number could become $n$ which is greater than 2, each one providing a phase shift of $180/n$ degrees in respect to the preceding network. In such an arrangement the system peculiar distortion would become $n$ greater than 2 times less. As many embodiments may be made of this inventive concept, and as many modifications may be made in the embodiment hereinbefore shown and described, it is to be understood that all matter herein is to be interpreted merely as illustrative, and not in any limiting sense.

Having described my invention, I claim:

1. A system for telegraphic and data transmission having a frequency modulated carrier signal input, comprising a plurality of phase-shifting networks including inputs and outputs and arranged in parallel to collectively receive said signal input, wave clipper means operatively connected to each of said phase-shift networks and having an output, differentiating means adapted to receive the output signal from said clipper means, adding means having an output and adapted to receive each of the outputs of said differentiating means, and rectifier means to receive the output of said adding means to substantially eliminate telegraph distortion in a transmitted signal.

2. A telegraphic system according to claim 1, wherein the output of said clipper means is of substantially square waveform.

3. A telegraphic system according to claim 1, wherein the said rectifier means is adapted to arrange all code pulses in a form in which said pulses all have positive polarity.

4. A telegraphic system according to claim 3, wherein said differentiating means is of a linear type.

5. A telegraphic system having a frequency modulated carrier signal input, comprising a plurality of phase-shifting networks including inputs and outputs and arranged in parallel circuit arrangement to collectively receive said signal input, waveform clipper means operatively connected to each of said phase-shift networks and having an output, differentiating network means including outputs and adapted to receive the output signal from said wave clipper means, adding means having an output and adapted to receive each of the outputs of said differentiating network means, and rectifier means adapted to receive the output of said adding means to substantially eliminate telegraph distortion in a transmitted signal.

6. A data transmission circuit for reducing the distortion in a demodulator for frequency modulated signals, comprising two shifting networks in parallel of the all-pass type in which the signals leaving these networks have a phase difference of about 90° for the whole frequency transmission band, means for collectively feeding an input signal to the two shifting networks, means to limit the sine form signals leaving said shifting networks to impart to these signals the form of rectangular waves, means to obtain from said rectangular waves short pulses corresponding to the instants of crossing the zero value of the sine form signals, means to add said short pulses, and means to make equal the polarity of said added short pulses.

References Cited

UNITED STATES PATENTS

| | | | |
|---|---|---|---|
| 2,394,544 | 2/1946 | Gottier | 325—475 |
| 3,349,329 | 10/1967 | Crafts | 178—88 X |

ROBERT L. GRIFFIN, *Primary Examiner.*

BENEDICT V. SAFOUREK, *Assistant Examiner.*

U.S. Cl. X.R.

178—88; 325—324, 474; 328—163